United States Patent

Haeggström

Patent Number: 5,147,005
Date of Patent: Sep. 15, 1992

[54] DRIVE FOR MOTOR VEHICLES

[76] Inventor: Gunnar O. Haeggström, 1, Körundavägen, 148 00 Osmo, Sweden

[21] Appl. No.: 507,504

[22] Filed: Apr. 11, 1990

[51] Int. Cl.⁵ ............................................. B60K 15/10
[52] U.S. Cl. ..................... 180/69.5; 60/39.465; 60/39.511; 60/736; 62/7; 62/50.2; 62/323.1; 180/65.3
[58] Field of Search ............... 180/69.5, 69.4, 65.3; 60/736, 39.465, 39.511; 165/110, 111; 62/7, 50.2, 48.4, 323.1, 323.2

[56] References Cited

U.S. PATENT DOCUMENTS

| | | | |
|---|---|---|---|
| 3,552,134 | 1/1971 | Arenson | 62/50.2 |
| 3,681,609 | 8/1972 | Boese et al. | 180/69.5 |
| 3,986,347 | 10/1976 | Schirmer | 60/39.511 |
| 4,329,842 | 5/1982 | Hoskinson | 62/50.2 |
| 4,535,866 | 8/1985 | Shiga | 180/68.4 |

FOREIGN PATENT DOCUMENTS 279222 12/1987 Japan ........................ 180/65.3
WO87/07357 12/1987 PCT Int'l Appl.

OTHER PUBLICATIONS

Man. Research Engineering Manufacturing (Germany) Apr.-1972.

Primary Examiner—Eric D. Culbreth
Attorney, Agent, or Firm—Finnegan, Henderson, Farabow, Garrett & Dunner

[57] ABSTRACT

A drive for buses and similar motor vehicles comprises a gas motor (14) which is provided to drive a generator (25) which in turn drives electric motors (27) which preferably are directly coupled to the drive wheels of the vehicle. The gas motor is driven by natural gas which is carried by the vehicle contained in containers (1) which maintain the natural gas at a temperature of about $-163°$ C. The natural gas is brought into gaseous condition by being transported through a first heat exchanger (7) where the liquid natural gas is exposed to the exhaust gases of the gas motor to attain a partial evaporation of the LNG. The partly evaporated liquid thereupon passes through a second heat exchanger where it is exposed to the cooling liquid of the gas motor and as a consequence thereof the LNG changes to a gaseous state and is finally supplied to the gas motor. In the first heat exchanger the natural gas passes through a block having a separation surface (8) and the exhaust gases pass over said separation surface thereby causing carbon dioxide to deposit on said separation surface as crystals which are removed via a lower space (20). The LNG is also utilized to produce a so called supra conduction which is utilized in connection with the electrical drive.

4 Claims, 1 Drawing Sheet

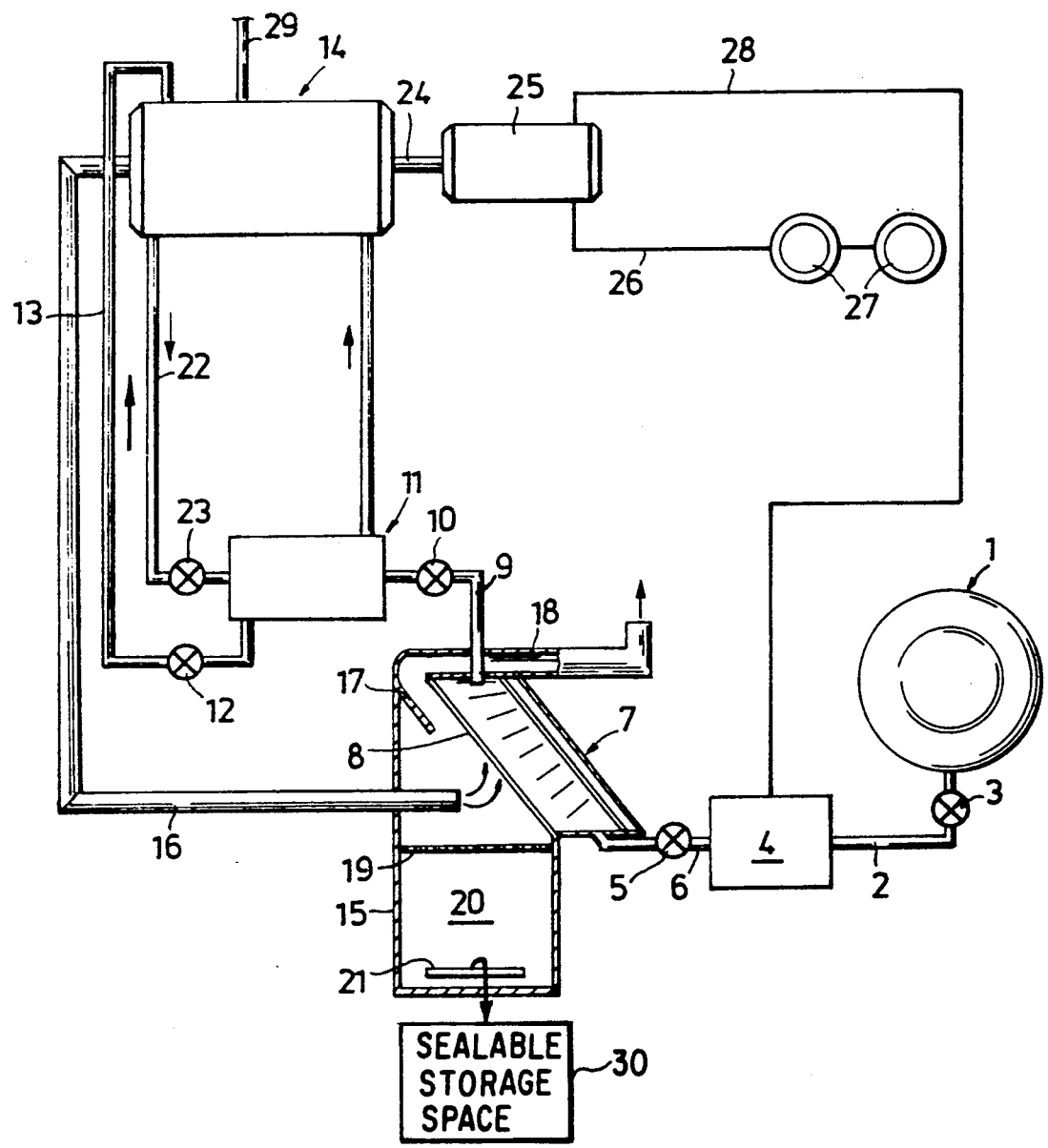

DRIVE FOR MOTOR VEHICLES

The present invention refers to a drive for motor vehicles such as buses.

There is today no motor vehicle which is really harmless to the environment and primarily suited for collective urban transport. Natural gas per se offers great advantages over gasoline and especially over Diesel oil but the carbon dioxide emitted when natural gas is combusted is not without harmful effects and for this and other reasons natural gas has not been used on a commercial scale for driving motor vehicles.

An object of the invention is to eliminate the drawbacks which have made the natural gas less suitable for the intended purpose and to provide a device for driving motor vehicles which is characteristised in minor harmful emissions of exhaust gas, noise etc. to the environment and which may be produced at a competetive price since most of the components may be of a conventional design and which with the actual gas prices will ensure a good operating economy and good road manners.

A further object is to achieve a good electric energy transfer efficiency by using supra conducting properties.

The accompanying drawing schematically illustrates an exemplary embodiment of the invention.

Although the invention primarily is intended to be practiced in buses and similar motor vehicles, and thus will be described in connection with such a vehicle, it should be noted that the invention is not restricted thereto but may be practiced in vehicles of various kinds.

In the embodiment illustrated in the drawing, a fuel tank of the vehicle consists of one or several gas holders 1, containing natural gas cooled to a temperature of approximately $-163°$ C., LNG. Said gas holders are preferably spherical in shape and designed so as to be able to keep the major portion of natural gas contained therein in a liquid state. In a manner known per se measures are taken to avoid that the respective gas holders are completely emptied since otherwise the low temperature would not be maintained and the temperature coefficient of the gas holder would have been changed. A conduit 2 leads from the gas holder or the battery of gas holders 1 and the conduit is provided with a control valve 3 of a pump 4 driven by an electric motor. The pump 4 transfer the still liquid gas through a conduit 6 provided with a control valve 5. The conduit 6 transfers the LNG to a first heat exchanging unit 7 which is provided to partly vaporize the LNG. The unit 7 includes a hollow block which has an oblique separation surface 8 for a purpose to be described.

A further conduit 9 having a control valve 10 extends from the first heat exchanging unit 7 to a second heat exchanging unit 11, the purpose of which being to completely bring the LNG into a gaseous state.

Through a conduit 13 provided with a control valve 12, the gas (which is now ready for use) is introduced into a gas motor 14.

The first heat exchanging unit 7 further includes a container 15 in which the separation surface 8 is located and the exhaust gases from the gas motor 14 are conducted to the interior of said container by a conduit 16. An inclined wall portion 17 forces the exhaust gases to pass over the separation surface 8 and to leave the container via a steam opening 18 or to enter subsequent units 7.

The container is preferably by means of a grate 19 divided into an upper space containing the separation surface 8 and a lower space 20 provided to collect the sediments which have been desposited on the separation surface 8. In the space 20 there can be provided a belt conveyor 21 or the like to continuously or intermittently transport said depositions to a sealable space 30 which is cooled, preferably by means of the LNG, preferably to a temperature less than $-78°$ C.

The cooling medium of the gas motor is transferred from the gas motor 14 through a conduit 22 having a control valve 23 into the second heat exchanging unit 11. The gas motor 14 drives a generator 25 from which leads an electric cable 26 to one or several electric motors 27, which constitute the drive motors of the vehicle. Another electric cable 28 supplies the pump motor 4 with electricity.

The drive device now described works in the following manner:

When the liquid natural gas (LNG) pressed through the hollow block of the first heat exchanging unit 7, the separation surface 8 is exposed to the hot exhaust gases from the gas motor (when the latter is running) and an evaporation takes place which transfers part of the LNG into gaseous condition. At the same time, a deposition of carbon dioxide crystals takes place upon the separation surface 8. The carbon dioxide transcends into solid shape at a temperature of $-78°$ C. while the liquid natural gas as mentioned has a temperature of about $-163°$ C.

Owing to the inclination of the separation surface in relation to the horisontal plane the major part of said crystals will fall down by gravity into the space 20, but it is possible to arrange separate strippers or the like to continuously or intermittently free the separation surface of such crystals.

By collecting the solid carbon dioxide and keeping it in a cooled condition it is possible to tap it to use it or sell it to consumers since such carbon dioxide is a commercial product.

The natural gas, which to a certain extent is in a gaseous state, is then supplied to the second heat exchanging unit 11 in which in a manner known per se occurs a heat exchange between the mediae transported in different channels, i.e. the cooling medium of the gas motor and the partly gaseous LNG. This heat exchange brings forth a cooling of the motor cooling medium which should have a temperature of about $90°$ C. when being introduced into the heat exchanger 11 but, at the same time, the natural gas receives so much heat from said cooling medium that the still liquid part thereof will change to gaseous state. This natural gas is fed to the gas motor.

As mentioned the gas motor drives the generator 25 to supply electrical energy to the electric drive motors 27 as well as the motor for the pump 4. It is obvious that the drive now described has the initially mentioned advantages as regards the effects on the environment. Owing to the electric drive and the fact that the electric motors preferably are provided to drive the vehicle wheels directly a range of further advantages are attained. Mechanical transmissions may be omitted which brings forth a light and cheap and easily operated unit.

Owing to the fact that the cooling medium of the gas motor will be heavily cooled it is possible to allow the cooling medium to have a higher temperature than normal, which means for example, heat resisting oil may be used as a cooling medium and that the cooling fan may be omitted. The higher cooling medium temperature further improves the mechanical efficiency of the motor. By further using the extremely low temperature of the LNG part thereof may be used for establishing so called supra conduction conditions. Such a supra conduction eliminates energy losses when electrical energy is transferred and this property could therefor be utilized in conducting the electric energy from the generator to the drive motors but also in said apparatuses, i.e. for producing the electric energy in the generator and the use thereof in the drive motors. Finally it may be mentioned that the gas motor even after short periods of rest may be started without particular measurements since a quantity of gas will remain in gaseous condition and further gas will rapidly be generated by means of the still relatively warm heat exchangers. After longer periods of still-standing for instance when the vehicle has been inactive overnight it might be necessary to start the motor in another way, for instance by use of gasoline which may be supplied through the conduit 29.

What I claim is:

1. A drive for large motor vehicles having at least one drive wheel, said drive comprising in combination:
    a gas motor (14) adapted to be fueled by natural gas;
    at least one electric motor (27) for driving the vehicle drive wheel;
    a generator (25) driven by said gas motor to supply electrical energy to said electric motor;
    at least one container carried by the vehicle for containing natural gas in a liquid state as LNG;
    means for transferring said LNG from said container to said gas motor and including a block (7) having a separation surface (8) and means for passing exhaust gases from said gas motor into heat exchange relation with said separation surface to convert carbon dioxide in the exhaust gases to a solid state and to convert said LNG in said block at least partially to a gaseous state; and
    means for transferring solid carbon dioxide from said separation surface to a sealable storage space on the vehicle;
    said gas motor including a cooling medium for transferring heat from said motor,
    said means for transferring said LNG including a further evaporation unit located downstream from said block and means for passing said cooling medium in heat exchange relation to partially gasified LNG passing from said block, thereby to bring said LNG into a completely gaseous state for transfer to said gas motor.

2. The drive recited in claim 1, wherein said separation surface is inclined in a downwardly facing orientation so that deposits of solid carbon dioxide will fall from said surface by gravity.

3. The drive recited in claim 1, wherein the vehicle includes a plurality of drive wheels and comprising a plurality of motors, one such motor for directly driving each of the respective drive wheels.

4. A drive as recited in claim 1, wherein said means for transferring said LNG comprises an electrical pump (4) driven by said generator for pumping said LNG from said container through said block.

* * * * *